US009731249B2

(12) United States Patent
Dai et al.

(10) Patent No.: US 9,731,249 B2
(45) Date of Patent: Aug. 15, 2017

(54) POLYMERIC MOLECULAR SIEVE MEMBRANES FOR GAS SEPARATION

(71) Applicant: UT-Battelle, LLC, Oak Ridge, TN (US)

(72) Inventors: Sheng Dai, Knoxville, TN (US); Zhenan Qiao, Oak Ridge, TN (US); Songhai Chai, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 323 days.

(21) Appl. No.: 14/667,968

(22) Filed: Mar. 25, 2015

(65) Prior Publication Data
US 2015/0290592 A1 Oct. 15, 2015

Related U.S. Application Data

(60) Provisional application No. 61/979,667, filed on Apr. 15, 2014.

(51) Int. Cl.
B01D 53/22 (2006.01)
B01D 69/12 (2006.01)
(Continued)

(52) U.S. Cl.
CPC ......... B01D 69/125 (2013.01); B01D 53/228 (2013.01); B01D 67/0006 (2013.01);
(Continued)

(58) Field of Classification Search
CPC .............. B01D 71/28; B01D 2325/022; B01D 2323/30; B01D 53/228; B01D 69/125; B01D 67/0006; B01D 69/02
See application file for complete search history.

(56) References Cited

U.S. PATENT DOCUMENTS 6,572,766 B1 * 6/2003 Bergstrom ........... B01J 20/3274
210/198.2
7,270,850 B2 9/2007 Krotz et al.
(Continued)

OTHER PUBLICATIONS

Budd P.M. et al., "Solution-Processed, Organophilic Membrane Derived from a Polymer of Intrinsic Microporosity", Advanced Materials 16(5):456-459 (Mar. 5, 2004).
(Continued)

Primary Examiner — Anthony Shumate
(74) Attorney, Agent, or Firm — Scully Scott Murphy & Presser

(57) ABSTRACT

A porous polymer membrane useful in gas separation, the porous polymer membrane comprising a polymeric structure having crosslinked aromatic groups and a hierarchical porosity in which micropores having a pore size less than 2 nm are present at least in an outer layer of the porous polymer membrane, and macropores having a pore size of over 50 nm are present at least in an inner layer of the porous polymer membrane. Also described are methods for producing the porous polymer membrane in which a non-porous polymer membrane containing aromatic rings is subjected to a Friedel-Crafts crosslinking reaction in which a crosslinking molecule crosslinks the aromatic rings in the presence of a Friedel-Crafts catalyst and organic solvent under sufficiently elevated temperature, as well as methods for using the porous polymer membranes for gas or liquid separation, filtration, or purification.

26 Claims, 11 Drawing Sheets

(51) Int. Cl.
  *B01D 71/28* (2006.01)
  *B01D 67/00* (2006.01)
  *B01D 69/02* (2006.01)
(52) U.S. Cl.
  CPC ............. *B01D 69/02* (2013.01); *B01D 71/28* (2013.01); *B01D 2323/30* (2013.01); *B01D 2325/022* (2013.01)

(56) References Cited

U.S. PATENT DOCUMENTS

| | | | |
|---|---|---|---|
| 7,785,397 B2 | 8/2010 | Kumar et al. | |
| 8,133,840 B2* | 3/2012 | Mika | B01J 20/28033 502/402 |
| 8,277,661 B2 | 10/2012 | Sah et al. | |
| 8,479,487 B2 | 7/2013 | Ku et al. | |
| 8,486,184 B2 | 7/2013 | Baumann et al. | |
| 8,815,273 B2* | 8/2014 | Atanasoska | A61L 31/022 424/422 |
| 2002/0167782 A1* | 11/2002 | Andelman | C02F 1/008 361/302 |
| 2003/0189005 A1* | 10/2003 | Inoue | B01D 61/48 210/660 |
| 2004/0203149 A1* | 10/2004 | Childs | B01J 47/018 435/404 |
| 2005/0139549 A1* | 6/2005 | Yoshida | B01J 20/28054 210/681 |
| 2006/0254969 A1* | 11/2006 | Yamanaka | B01D 15/361 210/198.2 |
| 2007/0068816 A1* | 3/2007 | Solomon | C08F 2/04 204/606 |
| 2007/0119774 A1 | 5/2007 | Yen et al. | |
| 2008/0188836 A1* | 8/2008 | Weber | A61L 29/085 604/890.1 |
| 2008/0264867 A1* | 10/2008 | Mika | B01J 20/28033 210/679 |
| 2008/0274307 A1* | 11/2008 | Chereau | B32B 27/12 428/17 |
| 2009/0157166 A1* | 6/2009 | Singhal | A61L 27/50 623/1.15 |
| 2009/0296873 A1* | 12/2009 | Izumi | B01J 47/028 376/313 |
| 2010/0209471 A1* | 8/2010 | Weber | A61L 27/30 424/423 |
| 2014/0205531 A1* | 7/2014 | Moon | H01B 1/04 423/445 R |
| 2014/0294701 A1 | 10/2014 | Dai et al. | |
| 2015/0118283 A1* | 4/2015 | Von Blucher | A61L 15/18 424/445 |

OTHER PUBLICATIONS

Carta M. et al., "An Efficient Polymer Molecular Sieve for Membrane Gas Separations", Science 339:303-307 (Jan. 18, 2013).
Cooper A.I., "Conjugated Microporous Polymers", Advanced Materials 21:1291-1295 (2009).
Cote A.P. et al., "Porous, Crystalline, Covalent Organic Frameworks", Science 310:1166-1170 (Nov. 18, 2005).
Dawson R. et al., "Nanoporous Organic Polymer Networks", Progress in Polymer Science 37:530-563 (2012).
Du N. et al., "Polymer Nanosieve Membranes for CO2-Capture Applications", Nature Materials 10:372-375 (May 2011).
McKeown N.B. et al., "Polymers of Intrinsic Microporosity (PIMs): Organic Materials for Membrane Separations, Heterogeneous Catalysis and Hydrogen Storage", Chem. Soc. Rev. 35:675-683 (2006).
McKeown N.B. et al., "Polymers of Intrinsic Microporosity (PIMs): Bridging the Void Between Microporous and Polymeric Materials", Chem. Eur. J. 11:2610-2620 (2005).
Qiao Z-A et al., "Polymeric Molecular Sieve Membranes Via In Situ Cross-Linking of Non-Porous Polymer Membrane Templates", Nature Communications, 5:3705, pp. 1-8, (Apr. 16, 2014).
Wang X. et al., "Preparation of Free-Standing High Quality Mesoporous Carbon Membranes", Carbon 48:557-570 (2010).
Zhu X. et al., "A Superacid-Catalyzed Synthesis of Porous Membranes Based on Triazine Frameworks for CO2 Separation", Journal of the American Chemical Society 134:10478-10484 (2012).

* cited by examiner

POLYMERIC MOLECULAR SIEVE MEMBRANES FOR GAS SEPARATION

CROSS-REFERENCE TO RELATED APPLICATIONS

This application claims priority from U.S. Provisional Application No. 61/979,667, filed Apr. 15, 2014, which is herein incorporated by reference in its entirety.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates to the field of porous polymer membranes, and methods of gas separation by use of porous polymer membranes.

BACKGROUND OF THE INVENTION

High-performance gas separation membranes are attractive for molecular-level separations in industrial-scale chemical, energy, and environmental processes. Membrane-separation technology has become a promising alternative to conventional energy-intensive separation processes such as distillation or absorption, for example, in natural gas sweetening, hydrogen recovery and production, carbon dioxide separation from flue gas, and air separation. Molecular sieving materials are widely regarded as next-generation membranes with the capability of simultaneously achieving high permeability and selectivity. Over the past decade, significant progress has been made in devising new types of molecular sieving materials, including zeolite, silica, metal organic frameworks (MOFs), and carbon-based membranes. Polymer membranes, in particular, are capable of providing a more energy-efficient method of gas separation because they do not require thermal regeneration, a phase change, or active moving parts in their operation; therefore, they are expected to play a growing role in an energy-constrained and low-carbon future.

However, there are several aspects of conventional polymer membranes that need improvement before polymer membranes can cost effectively be used on an industrial scale. In particular, most commercial polymer membranes for gas separation are based on a few polymers with low permeability and high selectivity, so they require large areas to compensate for lack of permeance; this increases costs and space requirements for large-scale applications. Microporous polymers with high permeability generally exhibit insufficient selectivity for practical applications, because they possess ill-defined voids that, because of chain flexibility, fluctuate in size, and therefore, have limited size-selectivity. Moreover, the fact that most microporous polymers are generally in a powdered state and insoluble in solvents makes the adaptation of this methodology to the preparation of membranes extremely difficult. Difficulties in processing the micropores into membranes and functionalizing them have limited their controlling gas-separation properties and further hindered the development of this field. Furthermore, membranes based on such microporous materials have not found commercial applications in gas separation because of scale-up impracticalities and high cost. Therefore, there remains the challenge of not only producing improved porous membranes for gas separation, but also, an improved methodology for preparing porous polymeric membranes that provide both the permeability and selectivity needed to support large-scale gas separations.

SUMMARY OF THE INVENTION

In one aspect, the instant disclosure is directed to porous polymer membranes that demonstrate exceptional performance as molecular sieves with high gas permeabilities and good selectivities for smaller gas molecules, such as $CO_2$ and $O_2$, over larger molecules, such as $N_2$. Hence, these porous membranes have excellent potential for large-scale gas separations of commercial and environmental relevance. In particular embodiments, the porous polymer membrane has a polymeric structure having crosslinked aromatic groups and a hierarchical porosity in which micropores having a pore size less than 2 nm are present at least in an outer layer of the porous polymer membrane, and macropores having a pore size of over 50 nm are present at least in an inner layer of the porous polymer membrane.

In another aspect, the instant disclosure is directed to an improved method for producing the above-described polymer membranes. The method employs an in situ crosslinking strategy for the preparation of polymeric molecular sieve membranes with hierarchical porosity. The method is advantageously straight-forward, cost effective, and is capable of selectively tailoring the porosity. In particular embodiments, the method includes subjecting a non-porous polymer membrane containing aromatic rings to a Friedel-Crafts crosslinking reaction in which a crosslinking molecule crosslinks the aromatic rings in the presence of a Friedel-Crafts catalyst and organic solvent under sufficiently elevated temperature.

In yet another aspect, the instant disclosure is directed to a method of gas separation by use of the above-described porous polymer membranes. In the method, a mixture of gases is passed through the above-described membrane, with the result that one or more gases pass through the membrane, while one or more gases are hindered or prevented from passing through the membrane. The selective passage or retainment of the gases can be attributed to pore size distribution, and possibly also differences in physisorption.

BRIEF DESCRIPTION OF THE DRAWINGS

FIG. 9G is a photo showing PS membrane (membrane A) and porous membranes crosslinked for 1.5 hours (membrane B), 3 hours (membrane C), 6 hours (membrane D), 12 hours (membrane E), and 24 hours (membrane F).

FIGS. 11F and 11G are photographs of the crosslinked PS-PEB-PS membranes.

DETAILED DESCRIPTION OF THE INVENTION

Figures 1A, 1B:
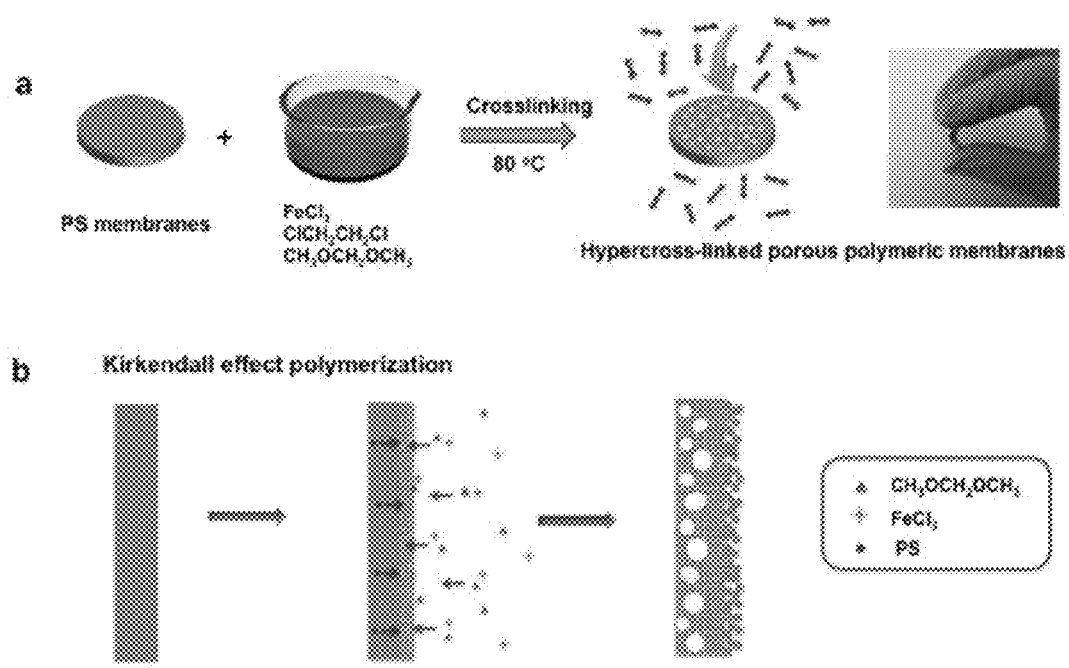
FIGS. 1A, 1B. Schematic illustration of an exemplary preparation procedure for the hypercross-linked porous polymeric membranes (FIG. 1A) and the non-equilibrium diffusion at the interface in membrane by Kirkendall effect polymerization (FIG. 1B).

In a first aspect, the disclosure is directed to a porous polymer membrane useful in gas separation and related applications. The porous polymer membrane possesses a polymeric structure in which is included aromatic groups that are crosslinked with each other and/or other components of the polymeric structure.

The polymeric structure is generally organic; however, in some embodiments, the polymeric structure may include an inorganic component, such as a polysiloxane derivatized with aromatic rings. The aromatic groups can be any of the aromatic rings known in the art, most notably benzene or naphthalene rings (e.g., phenyl or naphthyl groups). The aromatic rings are generally non-heteroaromatic (i.e., carbocyclic); however, in some embodiments, the aromatic ring may be heteroaromatic by including a heteroatom, such as nitrogen (e.g., pyridine or pyrrole) or oxygen (e.g., furan). The aromatic rings are covalently attached in the polymeric structure, either within the backbone of the polymer, such as in poly-p-phenylene, polyphenylenesulfide, or polyphenylenevinylene), or as pendant groups, such as in polystyrene, poly(phenyl acrylate) and poly(p-methylphenyl acrylate). In the case where aromatic rings are connected with each other within a backbone, the crosslinking groups further connect the backbone aromatic rings with each other so that the resulting crosslinked aromatic rings are at least trivalently bonded. The polymeric structure may be homopolymeric or copolymeric, and if copolymeric, may be classified as, for example, block, alternating, graft, periodic, random, or branched. The aromatic rings may or may not be substituted with one or more substituting groups, which may be, for example, hydrocarbon groups (e.g., alkyl groups, such as methyl, ethyl, or isopropyl), halide atoms, hydroxy, or alkoxy groups. The crosslinking group is generally a hydrocarbon group, particularly an alkylene group (e.g., methylene or ethylene), or an arylene (e.g., phenylene), or an alkylene-arylene (e.g., phenylene-dimethylene).

The porous polymer membrane possesses micropores, which correspond to pore sizes less than 2 nm. In different embodiments, the micropores have a size of precisely, about, up to, or less than, for example, 0.2, 0.3, 0.4, 0.5, 0.6, 0.7, 0.8, 0.9, 1.0, 1.2, 1.5, or 1.8 nm, or a particular pore size, or a distribution of pore sizes, within a range bounded by any two of these values. As used herein, the term "about" generally indicates within ±0.5%, 1%, 2%, 5%, or up to ±10% of the indicated value. For example, a pore size of about 10 nm generally indicates in its broadest sense 10 nm±10%, which indicates 9.0-11.0 nm. Alternatively, the term "about" can indicate a variation or average in a physical characteristic of a group, e.g., a population of pores.

For purposes of the invention, the micropores are located at least in an outer layer of the porous polymer membrane. The term "outer layer", as used herein, corresponds to a layer closer to the surface of the porous polymer membrane compared to an "inner layer". Thus, the term "outer layer" can refer to a region of the porous polymer membrane that does not encompass the entire inner portion (inner layer) of the porous polymer membrane. In some embodiments, the outer layer refers to a region of the porous polymer membrane extending from the surface of the porous polymer membrane to a level that approaches but does not reach the center of the porous polymer membrane. The inner layer generally occupies the center of the porous polymer membrane. In other embodiments, the outer layer refers to a region of the porous polymer membrane extending from below the surface of the porous polymer membrane to a level that approaches but does not reach the center (midway point) of the porous polymer membrane. In some embodiments, the micropores are located only within an outer layer. In other embodiments, the micropores are located in an outer layer and inner layer. In yet other embodiments, the micropores are located throughout the porous polymer membrane, i.e., throughout the interior and up to the surface of the membrane.

The porous polymer membrane also possesses macropores, which correspond to pore sizes greater than 50 nm. In different embodiments, the macropores have a size of precisely, about, at least, greater than, up to, or less than, for example, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 250 nm, 300 nm, 350 nm, 400 nm, 450 nm, 500 nm, 600 nm, 700 nm, 800 nm, 900 nm, 1000 nm (1 µm), 1.5 µm, 2 µm, 3 µm, 4 µm, 5 µm, 6 µm, 7 µm, 8 µm, 9 µm, 10 µm, 12 µm, 15 mm, 18 µm, 20 µm, 25 µm, 30 µm, 40 µm, 50 µm, 60 µm, 70 µm, 80 µm, 90 µm, or 100 µm, or a particular pore size, or a distribution of sizes, within a range bounded by any two of the foregoing values. For purposes of the invention, the macropores are located at least in an inner layer of the porous polymer membrane, wherein the term "inner layer" has been described above in comparison to the term "outer layer". In order for efficient gas separation to occur, the macropores preferably do not extend to the surface or over the entire region where micropores are located. In particular embodiments, the layers occupied by micropores and macropores do not substantially overlap or do not overlap altogether, i.e., regions are present that contain micropores without macropores, and macropores without micropores, even though there may or may not be a region in which macropores and micropores overlap.

In some embodiments, the porous polymer membrane further includes mesopores having a pore size of at least or above 2 nm and up to or less than 50 nm. In different embodiments, the mesopores have a pore size of precisely, about, at least, above, up to, or less than, for example, 3 nm, 4 nm, 5 nm, 6 nm, 7 nm, 8 nm, 9 nm, 10 nm, 11 nm, 12 nm, 15 nm, 20 nm, 25 nm, 30 nm, 35 nm, 40 nm, or 45 nm, or a particular pore size, or a distribution of pore sizes, within a range bounded by any two of the foregoing exemplary values, or between 2 nm and any of the foregoing exemplary values, or between one of the foregoing exemplary pore sizes and 50 nm. The mesopores may be located anywhere in the porous polymer membrane, and may overlap in one or more regions occupied by micropores and/or macropores. In a particular embodiment, the mesopores are present at least or only in an outer layer, or more particularly, in a surface layer of the porous polymer membrane. The term "surface layer", as used herein, corresponds to a layer in the porous polymer membrane that extends from the surface of the membrane to a region extending into the membrane but that does not extend through the entire membrane or that approaches but does not extend through the center of the membrane. In some embodiments, the mesopores are present in a surface layer that is disposed more outwardly toward the surface than the region occupied by micropores and macropores with or without overlapping with the region occupied by micropores and/or macropores.

In particular embodiments, the porous polymer membrane includes a hierarchical porosity characterized by the presence of macropores in an inner layer of the membrane, micropores in an outer layer of the membrane, and mesopores in a surface layer of the membrane. In each layer, there may or may not be overlap in the region occupied by macropores and micropores, and/or between micropores and mesopores, and/or between macropores and mesopores.

The pores are generally circular or oval-shaped. For circular or substantially circular pores, the pore size refers to the diameter of the pore. For pores that are substantially unsymmetrical or irregularly shaped, the pore size generally refers to either the average of the pore dimensions for a particular pore, or to the average or longest dimension of such pores averaged over a population of such pores.

In one set of embodiments, a single distribution of pores is present in the porous membrane. A distribution (or "mode") of pores is generally defined by a single pore size of maximum (peak) pore volume concentration. The peak pore volume may be in the micropore, mesopore, or macropore size range.

In some embodiments, the porous membrane possesses a bimodal, trimodal, or higher modal pore size distribution, which can be identified by the presence of, respectively, two, three, or a higher number of peak volume concentrations. In the case of a bimodal pore size distribution, the pore size distribution may be defined by a minimum pore size in the micropore size range and a maximum pore size in the macropore size range, with one peak pore volume in the micropore size range and one peak pore volume in the macropore size range, or alternatively, with both peak pore volumes in the micropore size range or both peak pore volumes in the macropore size range. In the case of a trimodal pore size distribution, the pore size distribution may be defined by a minimum pore size in the micropore size range and a maximum pore size in the macropore size range, with, for example, one peak pore volume in the micropore size range, one peak pore volume in the mesopore size range, and one peak pore volume in the macropore size range, or alternatively, with one peak pore volume in the micropore size range and two peak pore volumes in the mesopore size range or macropore size range.

In particular embodiments, the porous membrane may have a multimodal (e.g., bimodal, trimodal, or higher multimodal) mesopore size distribution, which can be identified by the presence of, respectively, two, three, or a higher number of peak mesopore volume concentrations associated with, respectively, one, two, three, or a higher number of individual mesopore size distributions bounded on each end by a minimum mesopore size and a maximum mesopore size. The pore size distributions can be overlapping or non-overlapping. For example, the porous membrane can include a monomodal, bimodal, trimodal, or higher multimodal mesopore size distribution, wherein each mesopore size distribution is bounded by a minimum mesopore size and maximum mesopore size selected from 2 nm, 3 nm, 4 nm, 5 nm, 6 nm, 7 nm, 8 nm, 9 nm, 10 nm, 12 nm, 15 nm, 20 nm, 25 nm, 30 nm, 35 nm, 40 nm, 45 nm, and 50 nm. Any of the exemplary mesopore sizes provided above can also be taken as a pore size of peak pore volume concentration associated with a particular pore size distribution. The micropores and macropores may independently also be monomodal or multimodal.

Generally, for purposes of the instant invention, the pore volume attributed to micropores is greater than the pore volume attributed to macropores, or greater than the pore volume attributed to mesopores, or greater than the combined pore volume attributed to macropores and mesopores. For example, in different embodiments, the percent pore volume attributed to micropores (or a sub-range within micropores) may be at least or above 50%, 55%, 60%, 65%, 70%, 75%, 80%, 85%, 90%, 95%, 98%, or 99% pore volume (by total pore volume) wherein it is understood that the total pore volume corresponds to 100% pore volume. The percent pore volume attributed to mesopores and/or macropores in the porous membrane can independently be any suitable amount, e.g., precisely, about, at least, above, up to, or less than 1%, 2%, 5%, 10%, 15%, 20%, 25%, 30%, 35%, 40%, 45%, 50%, 55%, 60%, 65%, 70%, 75%, or 80% by total pore volume, wherein it is understood that a pore volume of at least 50% attributed to macropores and/or mesopores necessarily corresponds to a pore volume of less than 50% for micropores (e.g., at least or above 45%, 40%, 35%, 30%, 25%, or 20% pore volume for micropores with respect to total pore volume). However, in the case where micropores occupy the greatest pore volume, the pore volume attributed to macropores and/or mesopores should be less than 50%. In some embodiments, the porous polymer membrane may possess a substantial absence of mesopores. By a "substantial absence" of mesopores is generally meant that up to or less than 1%, 0.5%, or 0.1% of the total pore volume, or none of the pore volume, can be attributed to the presence of mesopores.

The pores of the porous polymer membrane can also possess a level of uniformity, generally either in pore diameter, pore shape, and/or pore interspacing. In particular embodiments, the pores of the porous membrane may possess an average pore size corresponding to any of the pore sizes exemplified above, subject to a degree of variation of no more than, for example, ±10 nm, ±8 nm, ±6, nm, ±5 nm, ±4 nm, ±3 nm, ±2 nm, ±1 nm, or ±0.5 nm. In some embodiments, any one of the types of pores described above (e.g., the micropores) are substantially uniform in size. The pores may also be arranged relative to each other with a certain degree of order, i.e., in a patterned or ordered arrangement. Some examples of ordered arrangements include a hexagonal or cubic arrangement.

The pores can have any suitable wall thickness. For example, in different embodiments, the wall thickness can be precisely, about, at least, or less than, for example, 1 nm, 2 nm, 3 nm, 4 nm, 5 nm, 6 nm, 7 nm, 8 nm, 9 nm, 10 nm, 11 nm, 12 nm, 15 nm, 18 nm, 20 nm, 25 nm, 30 nm, 40 nm, 50 nm, 60 nm, 70 nm, 80 nm, 90 nm, 100 nm, 125 nm, 150 nm, 175 nm, 200 nm, 250 nm, 300 nm, 350 nm, 400 nm, 450 nm, or 500 nm, or a wall thickness within a range bounded by any two of these values. The foregoing exemplary wall thicknesses can be for all pores, or for a portion of the pores, e.g., only for mesopores, macropores, or micropores.

The porous membrane may possess a BET surface area of about or at least, for example, 50, 100, 200, 300, 400, 450, 500, 550, 600, 650, 700, 750, 800, 900, 1000, 1500, 1800, 2000, 2200, 2500, 2800, or 3000 m$^2$/g, or a surface area within a range bounded by any two of these values. The porous membrane may also possess a total pore volume of precisely, about, or at least, for example, 0.2 cm$^3$/g, 0.3 cm$^3$/g, 0.4 cm$^3$/g, 0.5 cm$^3$/g, 0.6 cm$^3$/g, 0.7 cm$^3$/g, 0.8 cm$^3$/g, 0.9 cm$^3$/g, 1.0 cm$^3$/g, 1.2 cm$^3$/g, 1.5 cm$^3$/g, 1.8 cm$^3$/g, 2 cm$^3$/g, 2.2 cm$^3$/g, 2.5 cm$^3$/g, 3.0 cm$^3$/g, 3.5 cm$^3$/g, 4.0 cm$^3$/g, 4.5 cm$^3$/g, 5.0 cm$^3$/g, 5.5 cm$^3$/g, or 6.0 cm$^3$/g, or a pore volume within a range bounded by any two of these values.

The thickness of the porous polymer membrane is typically at least 20 microns (20 µm). In different embodiments, the porous membrane may have a thickness of precisely, about, up to, less than, at least, or above, for example, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, 100 µm, 110 µm, 120 µm, 130 µm, 140 µm, 150 µm, 200 µm, 220 µm, 250 µm, 300 µm, 320 µm, 350 µm, 400 µm, 450 µm, 500 µm, 600 µm, 700 µm, 800 µm, 900 µm, or 1000 µm, or a thickness within a range bounded by any two of these values. The choice of thickness very much depends on the ultimate application and conditions expected in the ultimate application. For example, for use in gas separation, the thickness will have a strong effect on the permeability and selectivity, and thus, may need to be carefully selected or adjusted to provide an optimal separation. The thickness of the membrane may also need to be selected on the basis of the types of gases to be separated.

The porous polymer membrane may or may not also function as part of a layered composite material, wherein the porous membrane either overlays, underlies, or is sandwiched between one or more layers of another material. In some embodiments, the one or more layers of another material provides greater structural integrity to the membrane. If used in gas or liquid separation, filtration, or purification, the one or more layers of another material necessarily include structural features (e.g., pores or slits) that permit the gas or liquid to flow through the membrane. The porous membrane or layered composite structure in which it is incorporated may have other applications, such as a component (membrane) of a battery (e.g., lithium-ion battery) or fuel cell, catalyst support, or component of an energy storage or conversion device. The one or more layers of another material may be porous or non-porous, and can be composed of, for example, a ceramic (e.g., silica, alumina, or aluminosilicate), paper, plastic, graphite, metal oxide, metal sulfide, metal selenide, metal telluride, metal nitride, metal phosphide, or an organic, inorganic, or hybrid polymer, or combination thereof, depending on the particular application. In some embodiments, the porous membrane is monolithic (i.e., not disposed on or overlaid with a substrate).

In another aspect, the instant disclosure is directed to a method for producing the porous polymer membrane described above. In the method, a non-porous polymer membrane (i.e., precursor membrane) having aromatic groups (which can have any of the polymer compositions described above, except in non-porous form) is subjected to a Friedel-Crafts reaction or a variation thereof in the presence of a Friedel-Crafts catalyst and a crosslinker having the capacity to crosslink between aromatic groups or between aromatic groups and another part of the polymer. The aromatic ring in the precursor polymer may or may not also be substituted with one or more groups, as long as at least one position remains on the aromatic ring for Friedel-Crafts alkylation, and as long as the substituting group does not substantially deactivate the aromatic ring. The molecular weight of the precursor polymer, which may correspond to the mass average molecular weight ($M_w$) or number number molecular weight ($M_n$), is typically at least 10,000 g/mole, and can be for example, at least, above, up to, or less than 20,000, 30,000, 40,000, 50,000, 100,000, 150,000, 200,000, 250,000, or 300,000 g/mole. The precursor membrane may have any suitable thickness, such as any of the thicknesses provided above for the porous polymer membrane.

The Friedel-Crafts reaction can employ any of the conditions and reagents well known in the art for conducting such a reaction. For example, the catalyst may be any of the Friedel-Craft catalysts well known in the art, e.g., ferric chloride ($FeCl_3$), aluminum trichloride ($AlCl_3$), $GaCl_3$, $SbCl_5$, $BF_3$, or $BiCl_3$. The solvent may also be any of the organic solvents known in the art, as long as the solvent does not degrade, react with, dissolve, or otherwise adversely affect the polymer membrane. The solvent may be, for example, a halogenated organic solvent, such as methylene chloride or 1,2-dichloroethane.

During the Friedel-Crafts reaction, the non-porous polymer membrane is subjected to a suitably elevated temperature to effect crosslinking, as long as the temperature does not degrade or otherwise adversely affect the polymer membrane. The temperature is typically at least 50° C. In different embodiments, the temperature employed is precisely, about, at least, above, up to, or less than, for example, 55° C., 60° C., 65° C., 70° C., 75° C., 80° C., 85° C., 90° C., 95° C., 100° C., 105° C., 110° C., 120° C., 130° C., 140° C., or 150° C., or a temperature within a range bounded by any two of the foregoing temperatures. The polymer membrane may be subjected to a substantially constant elevated temperature, or a changing (e.g., rising) temperature within a range of temperatures of at least 55° C., for any suitable period of time that completes the crosslinking reaction. The period of time may be about, at least, above, up to, or less than, for example, 15, 30, 45, 60, 90, 120, 180, or 240 minutes (4 hours), or 6, 12, 18, 24, 30, 36, 42, 48, 54, or 60 hours, or a period of time within a range bounded by any two of the foregoing periods of times, wherein it is understood that higher temperatures generally require shorter time periods to achieve the same effect.

The crosslinker can be any molecule that possesses at least two reactive groups that can engage in a Friedel-Crafts reaction with aromatic rings. The reactive groups may be selected from, for example, ether groups (e.g., methoxy or ethoxy groups), alkyl chlorides, alkyl bromides, acyl chlorides, and acyl bromides. Some examples of crosslinking molecules include:

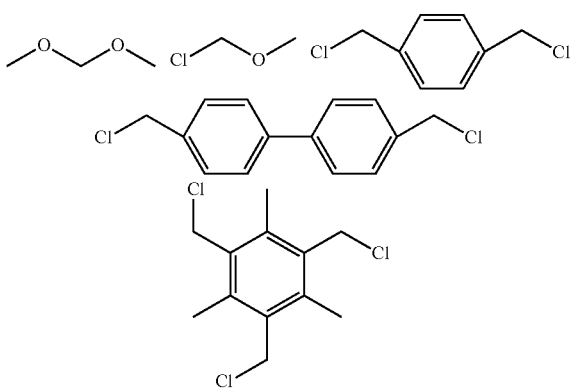

Typically, after the polymer membrane has completed the Friedel-Crafts reaction, the membrane, now porous, is washed by rinsing. The rinsing process can employ a suitable solvent (e.g., acetone, hydrocarbon solvent, ether, and/or water) and may or may not include an acid, such as hydrochloric acid. The washed membrane is then typically dried at a suitable temperature, such as at any of the temperatures provided above, but typically up to or less than 100° C., 80° C., or 60° C.

In yet another aspect, the instant disclosure is directed to a method of gas separation by passing a mixture of at least two gases through the porous polymer membrane described above. Since at least one gas in the mixture of gases is substantially or completely prevented from passing (i.e., traversing) through the membrane, the phrase "passing a mixture of at least two gases through the porous polymer membrane" includes the possibility that only one or more select gases of the gas mixture will actually pass through the membrane while one or more select gases may substantially or absolutely not pass through the membrane. The gas separation can be a partial or complete separation of gases. In the case of a partial separation, the partially separated gases may be passed through the membrane one or more additional times to improve on the separation. Moreover, the separation process may be conducted at a higher or lower temperature than room temperature (ca. 25° C.) and/or at a higher or lower pressure than normal atmospheric pressure (ca. 1 atm) in an effort to improve the separation. The gases being separated may be, for example, nitrogen and carbon dioxide, or nitrogen and oxygen, or nitrogen and hydrogen, or oxygen and carbon dioxide, or oxygen and hydrogen, or ammonia and oxygen, or ammonia and hydrogen, or hydrogen and helium, or methane and hydrogen or carbon dioxide. Any one of the aforesaid gases may alternatively be separated from a gaseous mixture containing more than two gases, such as air. In some embodiments, the gas separation process may be integrally connected with a gaseous output emanating from an industrial or chemical process. In other embodiments, one or more gases (e.g., oxygen, nitrogen, hydrogen, or carbon dioxide) may be selectively passed through the porous membrane from air or a source of exhaust gases while one or more other gases from air or a source of exhaust gases does not pass through the porous membrane.

In another embodiment, the gas separation process described above may be integrated with a process that uses a gas being separated by the above described process, i.e., the above described process may provide an in situ-generated separated gas for use in a process requiring the separated gas. Such an integrated process may be particularly advantageous in supplying a reactive gas (e.g., oxygen or hydrogen) over time (i.e., as produced in situ), which dispenses with the need to house a large stock of the reactive gas. A source of oxygen or oxygen-enriched air produced by the instant process may be integrated with, for example, a medical process, a welding process, a smelting process, or a chemical production process. A source of nitrogen or nitrogen-enriched air produced by the instant process may be integrated with, for example, a chemical production process (e.g., the production of ammonia by the Haber process), or a process requiring an inert gas to protect oxygen-sensitive compounds and materials, or a process for the production of liquid nitrogen or a process in which liquid nitrogen is used. A source of hydrogen produced by the instant process may be integrated with, for example, a process in which a fuel cell uses hydrogen as a reactant, a chemical production process (e.g., production of ammonia, hydrogenation, petroleum processing, production of syngas, or a reduction process), or a process for the production of liquid hydrogen or a process in which liquid hydrogen is used. A source of carbon dioxide produced by the instant process may be integrated with, for example, a process of making a food or beverage, a process for the production of liquid carbon dioxide or dry ice or a process in which liquid carbon dioxide or dry ice is used, or a process for bioconversion of carbon dioxide to fuel. A source of methane (natural gas) produced by the instant process may be integrated with, for example, a process that uses methane as fuel.

Examples have been set forth below for the purpose of illustration and to describe certain specific embodiments of the invention. However, the scope of this invention is not to be in any way limited by the examples set forth herein.

EXAMPLES

Preparation of a Porous Polymer Membrane with Hierarchical Porosity

Herein is described a facile and versatile, yet unexplored approach, referred to as an in situ crosslinking strategy, for the preparation of polymeric molecular sieve membranes having a sandwich structure with hierarchical and tailorable porosity. The structure comprises a macroporous core, a layer of dense micropores, and a mesoporous surface composed of small polymer nanoparticles. As provided in the general schematic in FIG. 1A, the exemplary process used non-porous polystyrene (PS) membranes as a precursor membrane template. Then, based on the Friedel-Crafts reaction, PS membranes were readily in situ crosslinked to produce hyper-crosslinked porous polymeric membranes. FIG. 1B depicts non-equilibrium diffusion at the interface in the membrane by Kirkendall effect polymerization. In the crosslinking process, formaldehyde dimethylacetal (FDA) was used as a crosslinker and $FeCl_3$ as a catalyst. This synthesis offers both tunable porosity and the formation of three well-defined pore networks, and these characteristics make the described membranes amenable to quantitative modeling of their mass transport properties. Thus, the porous polymeric membranes exhibit properties that are promising for use in gas separations with high permeability and favorable selectivity, and they also show potential for applications in liquid separations and membrane catalysis.

Polystyrene (PS) is a common commercial polymer, and it is very easy to fabricate PS membranes by dissolving it in a nonpolar solvent and casting it on the substrates. By simple immersion of non-porous PS membranes in a mixture of the crosslinker FDA, the catalyst $FeCl_3$, and the solvent 1,2-dichloroethane, PS membranes were crosslinked upon heating at 80° C. The resulting membranes were washed with acetone, diluted hydrochloric acid, and water, and then dried in a vacuum oven at 60° C. The crosslinked membranes were completely insoluble in common organic solvents, such as chloroform and toluene. The dimension and shape of crosslinked membranes were determined by those of the precursor PS membranes.

In a particular experiment, a porous polystyrene (PS) membrane was fabricated as follows:

First, a non-porous PS membrane (precursor) was fabricated by dissolving PS ($M_w$ ca. 15,900) in toluene or $CH_2Cl_2$ to from 16.7 wt % and 28.6 wt % polymer solutions. Then these solutions were drawn into a membrane on a glass substrate using a doctor's blade set at a gate height of 254 µm or 381 µm. After the membranes were cast, the solvent was allowed to evaporate for a predetermined period of time. Finally, PS membranes of varying thicknesses were successfully fabricated. The membranes derived from different PS molecular weights ($M_w$, ca. 35,000 and 192,000), PS-PB-PS (styrene 30 wt %, $M_w$ ca. 140,000), and PS-PEB-PS (styrene 22 wt %, $M_w$ ca. 128,000) were fabricated by the same method, wherein PB refers to polybutadiene and PEB refers to poly(ethylene-butylene).

Second, the above-described precursor was made porous by reacting with a Friedel Crafts catalyst and crosslinker in an organic solvent. In particular embodiments, $FeCl_3$ (4.875 g, 0.03 mol), FDA (2.28 g, 0.03 mol), and 10 mL 1,2-dichloroethane were combined and stirred in an ice bath for a good mix. Several pieces of PS membranes were added into the mixture, and then the mixture was heated to 80° C. for 24 hours without stirring. The resulting membranes were washed with acetone, 1 M hydrochloric acid, and pure water, and then dried in a vacuum oven at 60° C. for 24 hours.

Characterization of the Porous Polymer Membrane

Figures 2A, 2B, 2C:
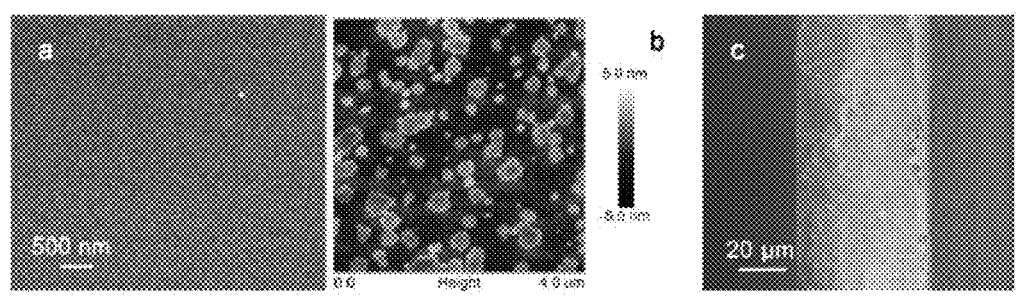
FIGS. 2A-2C. Scanning electron microscope (SEM) images of the 65 μm polystyrene (PS) membrane: top-view (FIG. 2A) and cross-section (FIG. 2C). Atomic force microscopy (AFM) image (4×4 μm$^2$) of the PS membrane (FIG. 2B).
Figures 3A, 3B, 3C, 3D, 3E, 3F:
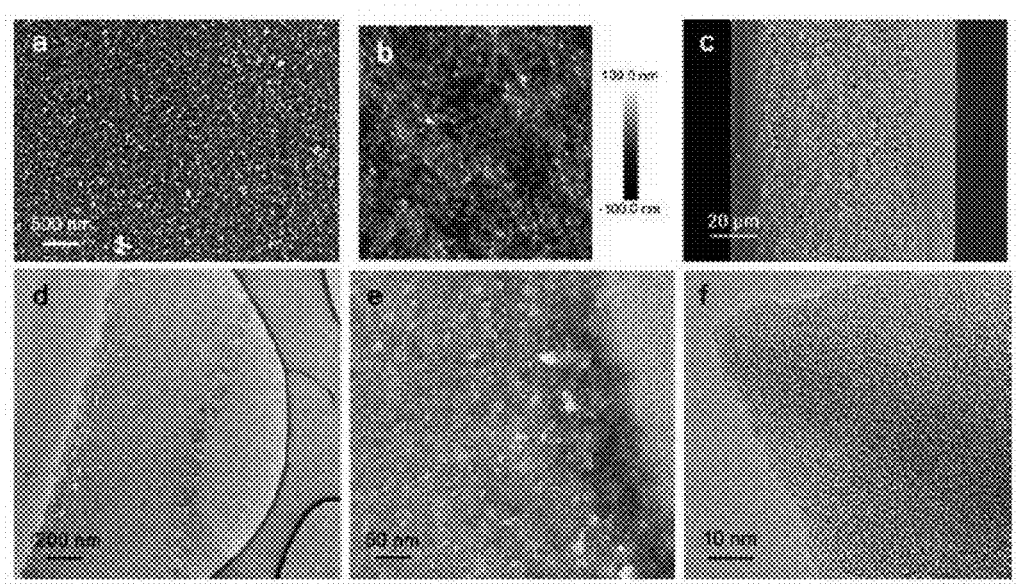
FIGS. 3A-3F. SEM images of the 97 μm porous polymeric membranes cross-linked for 24 hours: top view (FIG. 3A) and cross-section (FIG. 3C). AFM image (4×4 μm$^2$) (FIG. 3B) and high-resolution transmission electron microscope (TEM) images (FIGS. 3D-F) of this porous membrane.
Figures 4A, 4B, 4C, 4D, 4E, 4F:
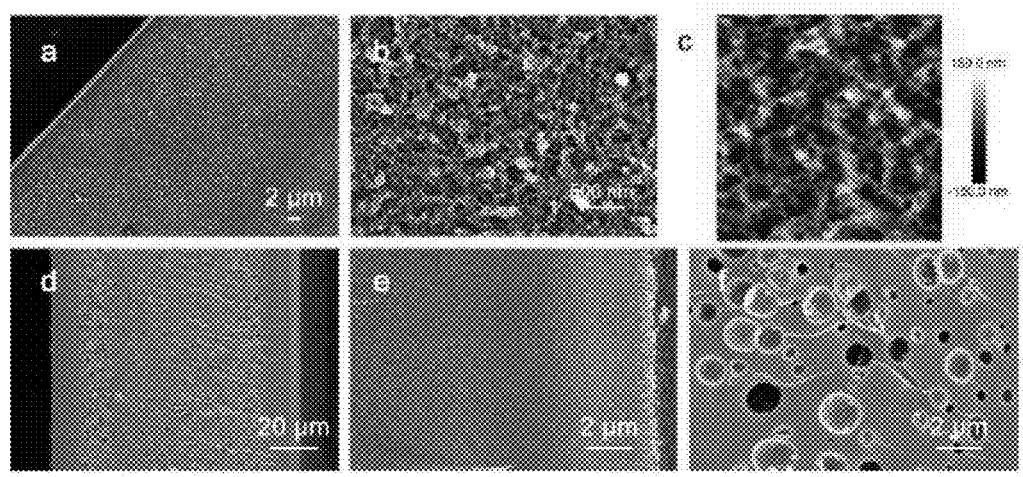
FIGS. 4A-4F. SEM images of the 109 μm porous polymeric membrane cross-linked for 24 hours: top-view (FIGS. 4A, 4B) and cross-section (FIGS. 4D-4F). AFM image (4×4 μm$^2$) of the porous membrane (FIG. 4C).
Figures 5A, 5B, 5C, 5D, 5E, 5F:
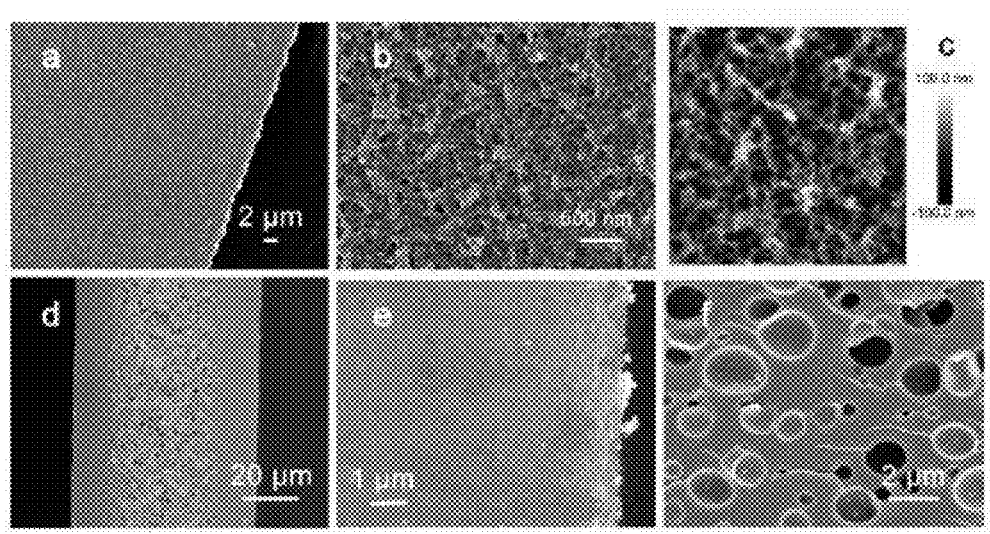
FIGS. 5A-5F. SEM images of the 86 μm porous polymeric membrane cross-linked for 24 hours: top-view (FIGS. 5A, 5B) and cross-section (FIGS. 5D-5F). AFM (4×4 μm$^2$) image of the porous membrane (FIG. 5C).

The morphology and nanostructure of the membranes were characterized by scanning electron microscopy (SEM), transmission electron microscopy (TEM), and atomic force microscopy (AFM). As revealed by SEM images (FIGS. 2A and 2C) and AFM image (FIG. 2B), the PS membrane exhibits a smooth, defect-free surface and nonporous structure. FIGS. 3A and 3C are SEM images, FIG. 3B is an AFM image, and FIGS. 3D-3F are TEM images of the PS membranes after being crosslinked for 24 hours. As shown by FIGS. 3A-3F, the membranes were still flexible and continuous without any noticeable pinholes or cracks at the micrometer scale. The polymeric membranes produced have thicknesses of ~86, 97, and 109 µm, depending on the initial thickness of the PS membranes, i.e., 50, 65, and 85 µm. As shown by the micrograph images shown in FIGS. 3A-3F (for 97 micron thick membranes after 24 hour crosslinking), and also FIGS. 4A-4F (for 109 micron thick membranes after 24 crosslinking, with FIGS. 4A, 4B, and 4D-4F being SEM images and FIG. 4C being AFM image) and FIGS. 5A-5F (for 86 micron thick membranes after 24 hour crosslinking, with FIGS. 5A, 5B, and 5D-5F being SEM images and FIG. 5C being AFM image), the three crosslinked membranes exhibit similar characterization results.

A 97 µm thick membrane is considered the representative type in the following discussion. Remarkably enough, the top-view and cross-sectional SEM and high-resolution TEM images of the 97 µm-thick membrane clearly reveal the sandwich structure with hierarchical porosity, which comprises a macroporous core, a layer of dense micropores, and a mesoporous surface. The observations under SEM at higher magnification and under AFM show that the outer continuous network of the mesoporous surface is composed of small polymer nanoparticles with about 15-30 nm diameters (FIGS. 3A, 3B). Closer examination of the mesopores on the cross-section of the membrane, as provided in FIG. 3D, reveals that the mesopores run from the top surface into the underlying microporous layer, and the thickness of the mesoporous layer is about 1 µm. As provided in FIG. 3C, randomly distributed macroporosity is observed on the micrometer length scale throughout the interior membranes. These macropores, albeit broadly distributed in size, form an interconnected network characteristic of co-continuous structures. As particularly provided in the TEM images of FIGS. 3E and 3F, within the whole polymer membrane struts, a large number of micropores with a pore size of 0.5 nm can be observed, as estimated from an analysis of the high-resolution TEM images; and a fraction of the pores is accessible from the mesopores and macropores.

Figures 6A, 6B:
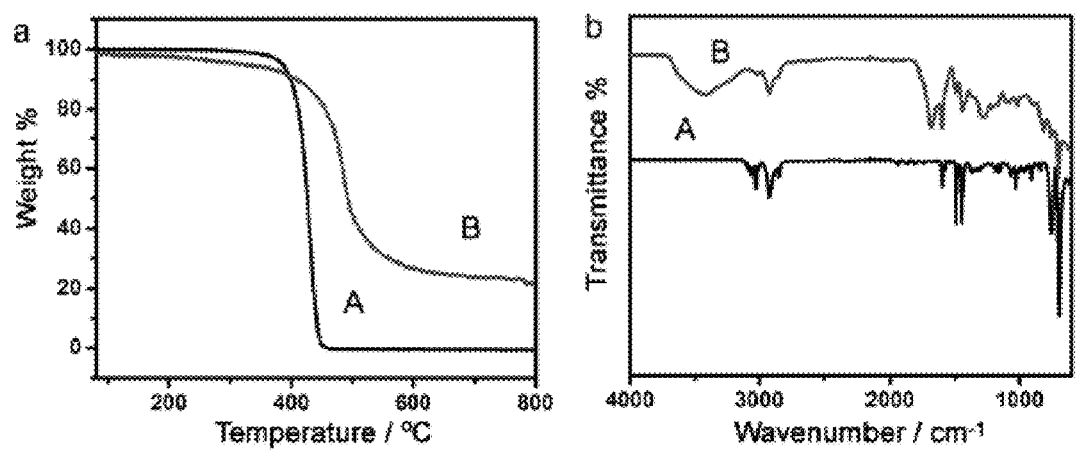
FIGS. 6A, 6B. Thermogravimetric analysis (TGA) curves (FIG. 6A) and FTIR spectrum (FIG. 6B) of PS (curve A) and porous polymeric membrane (curve B).
Figures 7A, 7B, 7C:
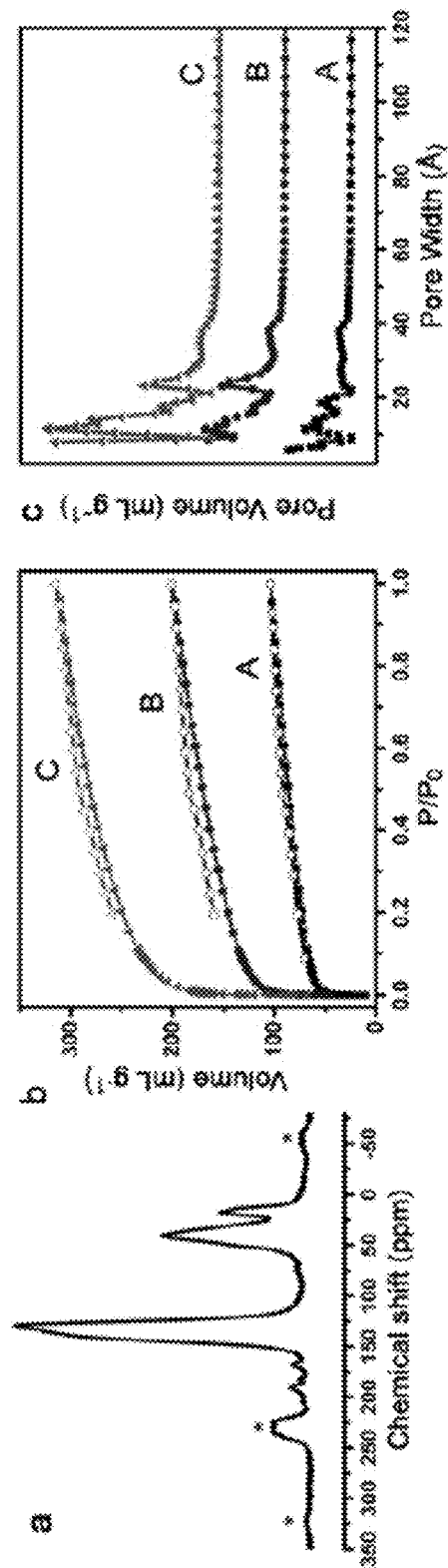
FIGS. 7A-7C. Cross-polarization (CP) $^{13}$C MAS natural abundance NMR spectrum of the 97 μm porous polymeric membrane, wherein asterisks denote spinning sidebands (FIG. 7A). Nitrogen adsorption-desorption isotherms at 77 K (FIG. 7B) and pore size distributions (FIG. 7C) based on NLDFT calculation for the porous membranes with different thicknesses: 109 μm (curve A), 97 μm (curve B), and 86 μm (curve C).

The structural properties of the porous polymeric membranes were characterized using various spectroscopic measurements and thermogravimetric analysis (TGA). FIG. 6A shows TGA curves for the polystyrene precursor membrane (line A) and corresponding porous polymer membrane (line B). As shown in FIG. 6A, the improved stability of the crosslinked porous membrane, relative to the precursor, is consistent with the generation of a rigid crosslinking polymeric framework. FIG. 6B shows Fourier transform infrared spectra for the polystyrene precursor membrane (line A) and corresponding porous polymer membrane (line B). As shown in FIG. 6B, the crosslinked membrane shows the bands at around 1600, 1500, and 1440 $cm^{-1}$, which are attributed to aromatic ring skeleton vibrations and are consistent with the structure of PS. Solid state $^{13}C$ cross-polarization magic angle spinning nuclear magnetic resonance (CP-MAS NMR) spectroscopy shows resonance peaks near 137 and 130 ppm, which are assigned to aromatic carbon and nonsubstituted aromatic carbon, respectively. As shown by the $^{13}C$ CP-MAS NMR spectrum shown in FIG. 7A, the resonance peak near 43 ppm could be assigned to the carbon in the methylene linker formed after the Friedel-Crafts reaction.

The porous properties of the membranes were investigated by nitrogen sorption analysis measured at 77 K. As shown by the $N_2$ adsorption-desorption isotherms of porous polymeric membranes in FIG. 7B, the different thicknesses exhibit a type I reversible sorption profile with a slight hysteresis loop at higher relative pressures, which indicates abundant micropore structure and the presence of mesopores in the membrane surface. The controllable surface areas of the porous membranes are as high as 260-792 $m^2/g$, increasing as the membrane thickness decreases from 109 m to 86 µm. As provided in the pore size distribution plots of porous polymeric membranes in FIG. 7C, all of the membranes exhibit a similar pore size distribution with a dominant pore size of 5.1 Å, and this agrees well with the size evaluated from high-resolution TEM images, as calculated using non-local density functional theory (NLDFT). Moreover, the mesopore sizes are in the range of 2-4.4 nm in these membranes. The pore size distribution curves suggest that all the membranes have hierarchical porosity and are predominantly microporous. The in situ crosslinking process should occur from the surface to the interior of the PS membranes. The reaction takes place much more easily in the thinner membranes, as they allow faster mass transport, In the above equation, V is the permeate volume, t is the membrane thickness, R is the gas constant, T is the absolute temperature, A is the membrane area, $\Delta p$ is the pressure difference across the membrane, and dp/dt is the rate of gas pressure increase on the permeate side.

The $CO_2$ permeabilities and ideal selectivities of the porous polymeric membranes of varying thickness (86-109 µm) are given in Table 1 below.

TABLE 1

Permeability and ideal selectivity values for porous polymeric membranes using a driving pressure of 35 kPa.

| Precursor | Thickness (µm) | Reaction time (h) | Permeability (barrer) $CO_2$ | $N_2$ | $CO_2/N_2$ selectivity |
|---|---|---|---|---|---|
| PS | 109 | 24 | 117.2 ± 1.7 | 4.3 ± 0.01 | 27.1 ± 0.5 |
| PS | 97 | 24 | 5261.0 ± 16.0 | 284.5 ± 3.9 | 18.5 ± 0.3 |
| PS | 86 | 24 | 26756.6 ± 105.1 | 3855.0 ± 14.2 | 6.94 ± 0.18 |
| PS | 96 | 1.5 | 222.2 ± 5.9 | 7.5 ± 0.3 | 29.6 ± 0.4 |
| PS | 96 | 3 | 1017.5 ± 1.4 | 37.0 ± 0.5 | 27.4 ± 0.5 |
| PS | 96 | 6 | 3870.8 ± 71.2 | 187.5 ± 3.9 | 20.6 ± 0.1 |
| PS | 97 | 12 | 4182.7 ± 80.2 | 199.3 ± 1.7 | 21.0 ± 0.5 |
| PS-PB-PS | 105 | 24 | 398.1 ± 2.1 | 36.4 ± 0.9 | 10.9 ± 0.2 |
| PS-PEB-PS | 95 | 24 | 21.3 ± 0.4 | 1.0 ± 0.1 | 21.8 ± 1.7 | which results in a higher surface area. Therefore, the thickness of the initial PS membranes has a dramatic effect on the surface areas of the porous membranes produced.

Given the hierarchical porous structures and excellent surface areas, the gas separation capabilities of the porous polymeric membranes were examined using a non-steady-state permeation cell at a temperature of 298 K and a pressure difference of 0.35 bar. Gas permeability measurements were performed using a custom test chamber. The porous polymeric membranes were masked by first placing a section of the material on a 47 mm² piece of adhesive-backed aluminum with a hole cut in the center. The membrane/adhesive aluminum assembly was then attached to a 47 mm² aluminum disk (1/16 in. thick) the center of which was cut with a mating hole corresponding to the hole in the adhesive-backed aluminum, thus creating a sandwich. A thin layer of epoxy was placed on the interface between the porous membrane and the aluminum to seal the membrane completely and to ensure that the only available diffusion path would be through the membrane. The diameter of the membrane, as defined by the holes cut in the center of the aluminum, was measured as 15 mm. The thickness of the membrane was measured using high-resolution calipers. The membrane was then placed in the test chamber and evacuated to about 20 mTorr, at which it remained overnight.

Single gas permeability measurements were obtained by isolating the two parts of the chamber (the permeate and retentate) and introducing each gas to the retentate side until a pressure of 35 kPa was reached. The pressure rise on the permeate side was monitored using a 10 Torr gauge and a data logging program. After an initial delay time corresponding to the diffusion time through the membrane, the pressure in the permeate side rose linearly with time. From the slope of this pressure rise and the properties of the membrane, the permeability was calculated using the following equation:

$$P = \frac{V \cdot t}{RTA(\Delta p)} \frac{dp}{dt}$$

Figures 8A, 8B, 8C, 8D:
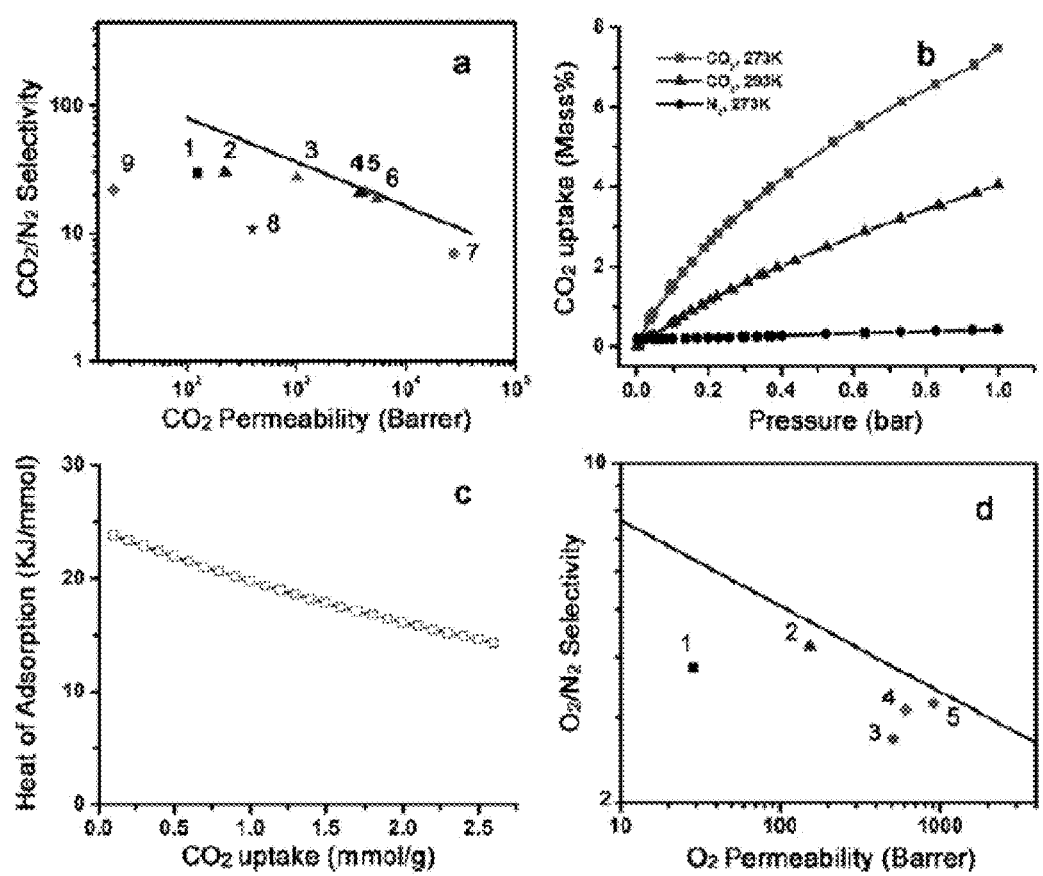
FIGS. 8A-8D. The Robeson plot relevant to porous polymeric membranes for a $CO_2/N_2$ gas pair showing the data for the 109, 97, and 86 μm membranes crosslinked for 24 hours (1, 6, and 7 data points); the 97 μm membranes crosslinked for 1.5, 3, 6, and 12 hours (2-5 data points); and the cross-linked PS-PB-PS (8) and PS-PEB-PS (9) membranes (FIG. 8A). $CO_2$ and $N_2$ adsorption isotherms of the 97 μm porous membranes crosslinked for 24 hours, measured at 273 and 298 K (FIG. 8B). Isosteric heats of adsorption for the porous membranes at different $CO_2$ loadings (FIG. 8C). The Robeson plot relevant to porous membranes for $O_2/N_2$ showing the data for the 97 μm membranes crosslinked for 1.5, 3, 6, 12, and 24 hours (1-5 data points) (FIG. 8D).

The $CO_2$ permeabilities of the membranes were particularly high, which is consistent with their enhanced hierarchical porosity and high surface areas. Under the same test condition, the $CO_2$ cannot be detected through PS membranes because of their non-porous structure. As the thickness of the porous polymeric membranes decreases from 109 to 86 µm, $CO_2$ permeabilities increase greatly, from 117 to 26,756 barrer; and selectivities decrease from 27.1 to 7, respectively. Polymeric membranes suffer from a well-defined trade-off between the desirable properties of permeability and selectivity. A plot of selectivity versus permeability, generally called a Robeson plot, is shown in FIG. 8A. The membrane with a thickness of 97 µm demonstrates both excellent permeability and selectivity, so that its data lie well on the Robeson upper bound for $CO_2/N_2$ gas pairs. The membranes were tested through six cycles under the same conditions and exhibited minimal change in either $CO_2$ permeability or $CO_2/N_2$ selectivity, indicating that the membranes should be a reversible system suitable for $CO_2$ sequestration. Only carbon and hydrogen form the polymeric framework, and no other elements or functional groups improve the gas adsorption and diffusion during the separation process. Therefore, the membrane performance can be directly ascribed to the molecular sieving characteristics of the membranes, which facilitate enhanced diffusivity and selectivity for $CO_2$ molecules with a smaller kinetic diameter ($CO_2$=3.3 Å) compared with $N_2$ molecules having a larger diameter ($N_2$=3.64 Å). The hierarchical porous structure makes gas molecule diffusion in these polymeric membranes easier than in traditional gas separation membranes, and the abundant microporosity in the whole polymeric framework leads to effective gas separation. The combination of the two factors results in the high permeability and excellent selectivity of the described porous polymeric membranes.

To provide a better understanding of membrane separation performance, the $CO_2$ adsorption of a 97 µm membrane was measured up to 1 bar at 273 K using a gravimetric microbalance and was shown to be 1.70 mmol g$^{-1}$ (7.47 mass %), for which the results are provided in FIG. 8B. The nitrogen adsorption results under the same conditions are also provided in FIG. 8B, which shows $N_2$ uptake was 0.154 mmol g$^{-1}$ (0.431 mass %). The estimated $CO_2/N_2$ adsorption selectivity was about 40. As provided in FIG. 8C, by fitting the $CO_2$ adsorption isotherms measured from 0.001 to 1 bar at different temperatures (273 and 298 K) and applying a variant of the Clausius-Claperyron equation, the isosteric heat of adsorption was calculated to be in the range 14.3-23.8 kJ mol$^{-1}$, much smaller than those of common MOP materials (25-33 kJ mol$^{-1}$). The foregoing result further demonstrates that the molecular sieving effect is largely responsible for the extraordinary membrane separation performance.

Figures 9A, 9B, 9C, 9D, 9E, 9F, 9G:
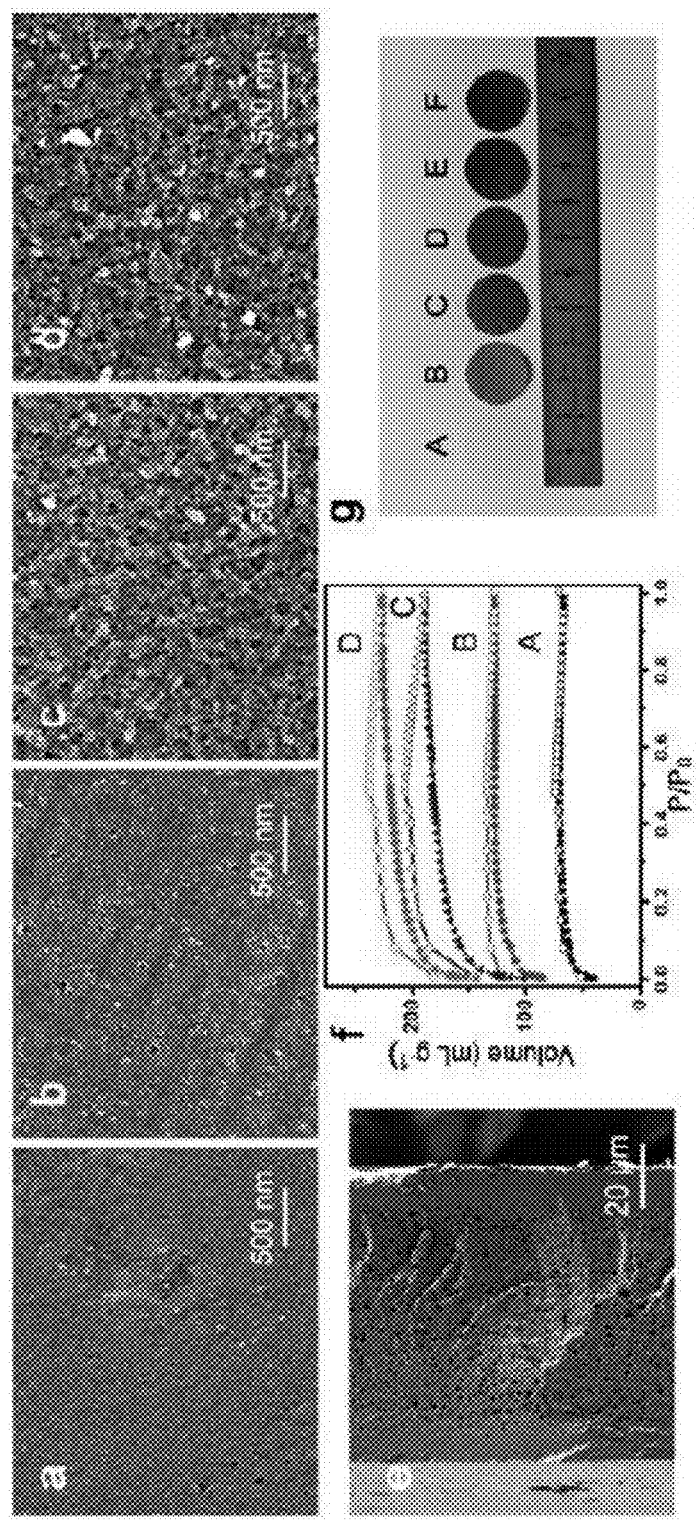
FIGS. 9A-9G. Top-view SEM images of the 97 μm porous polymeric membranes crosslinked for 1.5 hours (FIG. 9A), 3 hours (FIG. 9B), 6 hours (FIG. 9C), and 12 hours (FIG. 9D). Cross-sectional SEM image of the membrane cross-linked for 1.5 hours (FIG. 9E). $N_2$ adsorption-desorption isotherms of the porous membranes crosslinked for 1.5 hours (curve A), 3 hours (curve B), 6 hours (curve C), and 12 hours (curve D), wherein the isotherm is offset vertically by 40 mL g$^{-1}$ for curve D (FIG. 9F).
Figures 10A, 10B, 10C:
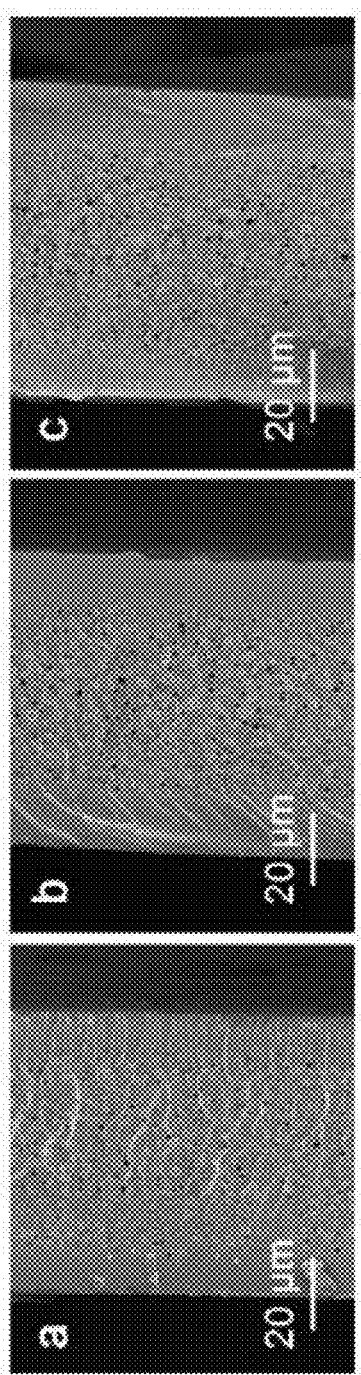
FIGS. 10A-10C. Cross-sectional SEM images of the 97 μm porous polymeric membrane crosslinked for 3 hours (FIG. 10A), 6 hours (FIG. 10B), and 12 hours (FIG. 10C).

A particular advantage of the above-described method for producing the porous polymeric membranes is its versatility in precisely controlling the pore size distribution and resulting gas separation performance and selectivity. In particular embodiments, such characteristics of the membrane are controlled by carefully controlling the crosslinking time. FIGS. 9A-9D show SEM micrographs of the top views of membranes of the same thickness (97 μm) reacting under identical conditions but with different crosslinking times of 1.5, 3, 6, and 12 hours, respectively. These micrographs elucidate the dependence of membrane surface structure on the length of the crosslinking step. After short crosslinking times (i.e., 1.5 and 3 hours), the membranes are observed to have a dense microporous skin layer, but only a few mesopores have begun to nucleate at the surface. A crosslinking time of 6 to 24 hours produces the desired open network nanostructure, which is a selective skin layer containing a high density of mesopores 12 to about 50 nm in diameter randomly distributed across the surface. As the crosslinking time increases, the surface mesopores increase in size and the membrane becomes more open, whereas the interior macropore layer does not change significantly, as evidenced by the cross-sectional SEM images in FIG. 9E of the 97 micron thick membrane crosslinked for 1.5 hours, as well as the cross-sectional SEM images in FIGS. 10A-10C for 97 micron thick membranes crosslinked for 3, 6, and 12 hours, respectively. All the isotherms of porous membranes with various crosslinking times also exhibit characteristic type I curves with distinct capillary condensation steps, which is suggestive of uniform micropores. As provided by the nitrogen adsorption-desorption isotherms in FIG. 9F, the surface areas increase from 218 to 618 m$^2$/g as crosslinking time increases from 1.5 hours (line A) to 3 hours (line B), to 6 hours (line C), to 12 hours (line D). After being crosslinked for 6 to 24 hours, the membranes show a similar surface area of 593±36 m$^2$/g and pore volume of 0.283±0.015 cm$^3$/g, which clearly indicates that the crosslinking process between crosslinker and PS membranes occurs quickly, and could even completely finish within 6 hours. Furthermore, as shown by Table 1 and the $CO_2$ permeabilities in FIG. 8A, as the crosslinking time increases, the $CO_2$ permeabilities increase from 222.2 to 5261 barrer, and $CO_2/N_2$ selectivities decrease from 30 to 18.5. Therefore, adjusting the crosslinking time can produce polymeric membranes with desirable pore structures, surface areas, and commercially favorable gas separation performance. Sheets of 97 μm membranes as large as 100 cm$^2$ were fabricated in the laboratory for gas separation testing. This fabrication method has the important advantage of industrial scalability. FIG. 9G is a photo showing PS membrane (membrane A) and porous membranes crosslinked for 1.5 hours (membrane B), 3 hours (membrane C), 6 hours (membrane D), 12 hours (membrane E), and 24 hours (membrane F).

The above observations suggest a one-pot polymerization-induced Kirkendall effect mechanism for the formation of sandwich-structured polymeric molecular sieve membranes with hierarchical porosity (FIG. 1B). The PS membrane surface is first reacted with FDA to produce a layer consisting of a microporous crosslinked polymer shell. The direct conversion of PS to porous polymer is therefore hindered by the layer, and the reaction will continue by the diffusion of FDA and FeCl$_3$ through the microporous layer. During this step, the diffusion rate of PS is faster than those of FDA and FeCl$_3$. The preferred outward diffusion of PS molecules from core to shell leads to a net material flux across the membrane interface and simultaneously results in a flow of fast-moving vacancies to the vicinity of the solid-liquid interface. The macroporous core appears to be formed through coalescence of the vacancies based on a nanoscale Kirkendall effect. With an increased degree of crosslinking, the surface micropores can gradually transform into mesopores, and the mesopores can increase in size. In situ crosslinking on the interfaces facing toward both the shell region and the core region yields fully microporous skeletal networks throughout the membrane thickness, forming a sandwich structure with a multi-scale tricontinuous network through which gases can be easily transported and effectively separated.

Use of the above-described porous membranes for the separation of $O_2$ or $N_2$ from air or other $O_2/N_2$ mixture is particularly important since these gases in their more isolated form have widespread uses. For example, air enriched in $O_2$ (or isolated oxygen) is commonly used in medicine, research, welding, smelting of iron ore into steel, and rocket fuel, and air enriched in $N_2$ (or isolated nitrogen) is commonly used as a reactant in the production of ammonia (e.g., in the Haber process), as an inert gas to protect oxygen-sensitive compounds and materials, and in the production of liquid nitrogen, a widespread refrigerant. Because these gases have almost the same kinetic diameters, the $O_2/N_2$ separation process is much more difficult than the process for many other gas pairs. In this respect, their permeability data are close to the Robeson upper bound, as shown in FIG. 8D, and thus, demonstrate great potential in the substantial or complete separation of $O_2$ from $N_2$. As with $CO_2/N_2$ pairs, the $O_2/N_2$ selectivities decrease from 4.2 to 3.1 as the crosslinking time increases, whereas the $O_2$ permeabilities increase from 29.1 to 222.2 barrer. This exceptional $O_2/N_2$ separation performance is similar to the performance of carbon molecular sieve membranes, further indicating that the gas separation performance of the porous membranes is due to a molecular sieving effect. This result suggests that the instantly described porous membranes are useful in at least partially separating $N_2$ or $O_2$ from air and for separating $O_2$ from $N_2$, and also have great potential for the substantial or complete separation of $N_2$ or $O_2$ from air and from each other.

Figures 11A, 11B, 11C, 11D, 11E, 11F, 11G:
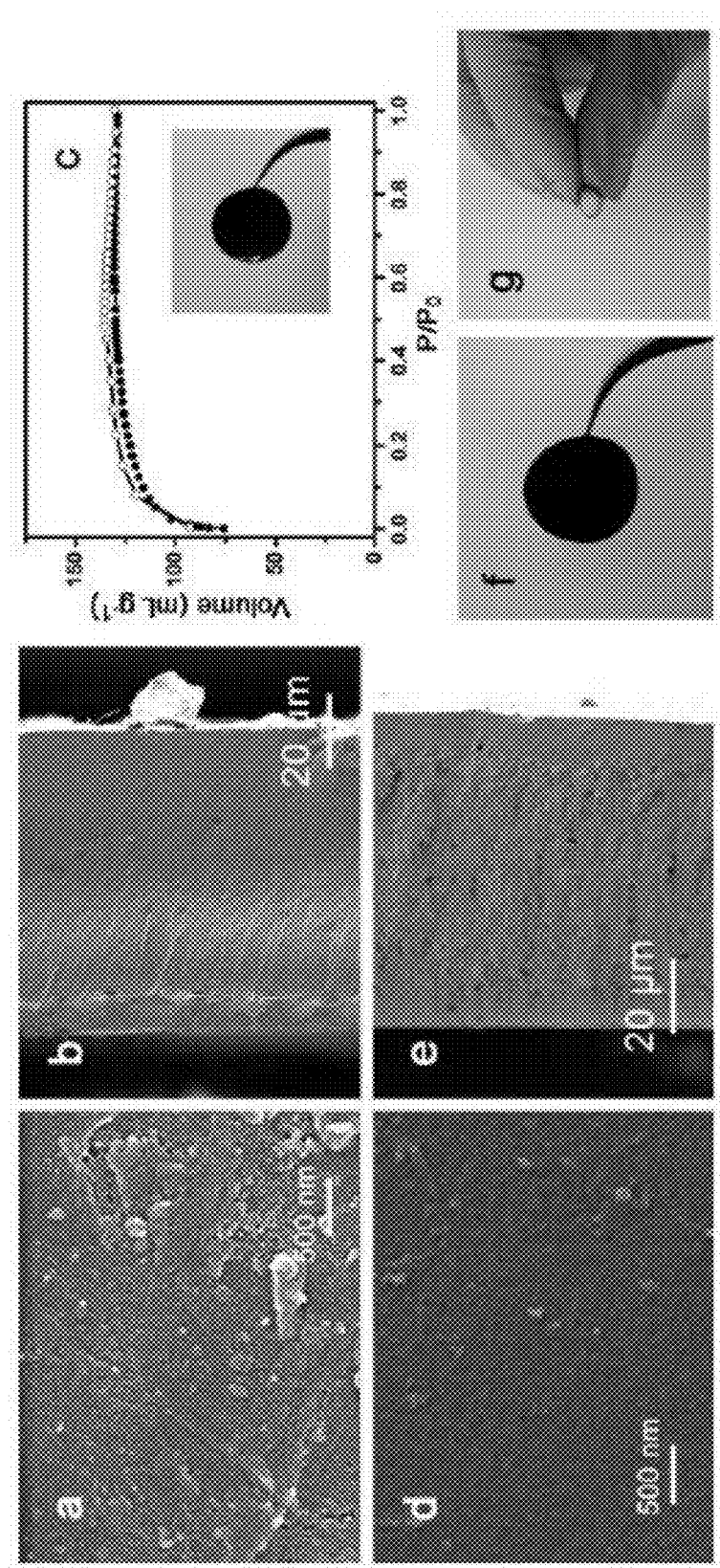
FIGS. 11A-11G. SEM images of the cross-linked PS-PB-PS (a, b) and PS-PEB-PS (d, e) membranes: top-view (FIGS. 11A, 11D) and cross-section (FIGS. 11B, 11E). $N_2$ adsorption-desorption isotherms of the crosslinked PS-PB-PS (FIG. 11C), wherein the inset is a photograph of the cross-linked PS-PB-PS membranes.

The above-described in situ crosslinking method can be extended to crosslink other PS-based block polymer membranes to prepare functionalized porous membranes. As provided by the nitrogen adsorption-desorption isotherm shown in FIG. 11C, the surface area and pore volume of crosslinked PS-block-polybutadiene-block-PS (PS-PB-PS) membranes are about 209 m$^2$/g and 0.11 cm$^3$/g, respectively, which clearly indicates that the flexible polybutadiene chains increase framework density and may block some parts of the micropores. The $CO_2$ permeability and $CO_2/N_2$ selectivity were measured at 398 barrer and 10.9, respectively, as provided in Table 1 and FIG. 8A. Although no surface area could be tested by nitrogen sorption analysis for crosslinked PS-block-poly(ethylene-ran-butylene)-block-PS-graft-maleic anhydride (PS-PEB-PS) membranes, $CO_2$ permeability and $CO_2/N_2$ selectivity were still 21.3 and 21.8, respectively, as provided in Table 1 and FIG. 8A. A small proportion of ultra-small micropores in the framework of the crosslinked membranes may permit only $CO_2$ molecules, with their smaller kinetic diameters, to pass through the membrane. SEM images of these two crosslinked polymeric membranes, as provided in FIGS. 11A, 11B, 11D, and 11E, revealed their dense structures, which further confirm that such a hierarchical porous structure greatly accelerates the gas diffusion rate during the separation process and simultaneously maintains high selectivity. Furthermore, as indicated by the photographs of the crosslinked PS-PEB-PS membranes shown in FIGS. 11F and 11G, the crosslinked PS-PEB-PS membranes are flexible and stretchable and could even be rolled up.

The above results demonstrate a facile, versatile one-pot approach for the preparation of hierarchically macro-, meso-, and microporous polymeric molecular sieve membranes via in situ crosslinking of PS membranes. The porous membranes exhibit properties useful in gas separations, with both excellent permeability and selectivity. Specifically, the tenability in structural characteristics, adjustability in gas separation properties, and controllable chemical functionalities of the described method provide an exceptional platform for the fabrication of polymeric gas-separation membranes with specifically tuned separation characteristics that can be optimally suited for a specific gas mixture.

While there have been shown and described what are at present considered the preferred embodiments of the invention, those skilled in the art may make various changes and modifications which remain within the scope of the invention defined by the appended claims.

What is claimed is:

1. A porous polymer membrane useful in gas separation, the porous polymer membrane comprising a polymeric structure having crosslinked aromatic groups and a hierarchical porosity in which micropores having a pore size less than 2 nm are present at least in an outer layer of the porous polymer membrane, and macropores having a pore size of over 50 nm are present at least in an inner layer of the porous polymer membrane.

2. The porous polymer membrane of claim 1, wherein said polymeric structure is a polystyrene-containing structure.

3. The porous polymer membrane of claim 1, wherein the porous polymer membrane has a thickness of at least 50 microns and up to 150 microns.

4. The porous polymer membrane of claim 1, wherein the porous polymer membrane has a thickness of at least 80 microns and up to 120 microns.

5. The porous polymer membrane of claim 1, wherein said micropores have a pore size of up to 1 nm.

6. The porous polymer membrane of claim 1, wherein said macropores have a pore size of at least 100 nm.

7. The porous polymer membrane of claim 1, wherein said macropores have a pore size of at least 200 nm.

8. The porous polymer membrane of claim 1, wherein said macropores have a pore size of at least 500 nm.

9. The porous polymer membrane of claim 1, wherein said macropores have a pore size of at least 1 micron.

10. The porous polymer membrane of claim 1, wherein said hierarchical porosity further comprises mesopores having a pore size of at least 2 nm and up to 50 nm.

11. The porous polymer membrane of claim 10, wherein said mesopores are present at least in a surface layer of the porous polymer membrane.

12. The porous polymer membrane of claim 1, wherein a pore volume due to micropores is greater than the combined pore volume due to macropores and mesopores.

13. A method for fabricating a porous polymer membrane having a hierarchical porosity, the method comprising subjecting a non-porous polymer membrane containing aromatic rings to a Friedel-Crafts crosslinking reaction in which a crosslinking molecule crosslinks said aromatic rings in the presence of a Friedel-Crafts catalyst and organic solvent under sufficiently elevated temperature to provide said porous polymer membrane having a hierarchical porosity, wherein said hierarchical porosity comprises micropores having a pore size less than 2 nm present at least in an outer layer of the porous polymer membrane, and macropores having a pore size of over 50 nm present at least in an inner layer of the porous polymer membrane.

14. The method of claim 13, wherein said elevated temperature is within a range of 50° C. to 150° C.

15. The method of claim 13, wherein said elevated temperature is within a range of 60° C. to 120° C.

16. The method of claim 13, wherein said non-porous polymer has a polystyrene-containing composition.

17. The method of claim 13, wherein the porous polymer membrane has a thickness of at least 50 microns and up to 150 microns.

18. The method of claim 13, wherein the porous polymer membrane has a thickness of at least 80 microns and up to 120 microns.

19. The method of claim 13, wherein said micropores have a pore size of up to 1 nm.

20. The method of claim 13, wherein said macropores have a pore size of at least 100 nm.

21. The method of claim 13, wherein said macropores have a pore size of at least 200 nm.

22. The method of claim 13, wherein said macropores have a pore size of at least 500 nm.

23. The method of claim 13, wherein said macropores have a pore size of at least 1 micron.

24. The method of claim 13, wherein said hierarchical porosity further comprises mesopores having a pore size of at least 2 nm and up to 50 nm.

25. The method of claim 24, wherein said mesopores are present at least in a surface layer of the porous polymer membrane.

26. The method of claim 13, wherein a pore volume due to micropores is greater than the combined pore volume due to macropores and mesopores.

* * * * *